(12) United States Patent
Eaton

(10) Patent No.: US 9,361,939 B1
(45) Date of Patent: Jun. 7, 2016

(54) DATA STORAGE DEVICE CHARACTERIZING GEOMETRY OF MAGNETIC TRANSITIONS

(71) Applicant: Western Digital Technologies, Inc., Irvine, CA (US)

(72) Inventor: Robert E. Eaton, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/230,452

(22) Filed: Mar. 31, 2014

Related U.S. Application Data

(60) Provisional application No. 61/950,766, filed on Mar. 10, 2014.

(51) Int. Cl.
*G11B 5/02* (2006.01)
*G11B 21/02* (2006.01)

(52) U.S. Cl.
CPC ...................................... *G11B 21/02* (2013.01)

(58) Field of Classification Search
None
See application file for complete search history.

(56) References Cited

U.S. PATENT DOCUMENTS

| | | | |
|---|---|---|---|
| 4,516,162 A * | 5/1985 | West ................................ 360/25 |
| 5,444,583 A * | 8/1995 | Ehrlich et al. ............. 360/78.09 |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,063 A * | 8/2000 | Chainer et al. .................. 360/75 |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |

(Continued)

OTHER PUBLICATIONS

M. Hashimoto, et al., "Analysis of Written Transition Curvature in Perpendicular Magnetic Recording From Spin-Stand Testing" IEEE Trans. on Magnetics, vol. 43, No. 7, Jul. 2007, 5 pages.

(Continued)

*Primary Examiner* — K. Wong

(57) ABSTRACT

A data storage device is disclosed comprising a head and a disk comprising servo information and a reference pattern comprising a plurality of magnetic transitions. The servo information on the disk is processed to actuate the head over the disk, and a read signal is sampled from the head as the head moves across a width of the reference pattern at a substantially constant velocity to generate signal samples. The signal samples are processed to characterize a geometry of the magnetic transitions.

34 Claims, 9 Drawing Sheets

(56) References Cited

U.S. PATENT DOCUMENTS

| | | |
|---|---|---|
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,002,762 B2 * | 2/2006 | Mayergoyz et al. ............ 360/46 |
| 7,005,849 B2 * | 2/2006 | Tse et al. ...................... 324/212 |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,083 B2 * | 5/2006 | Ehrlich ............................ 360/29 |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,075,742 B2 * | 7/2006 | Ehrlich ............................ 360/29 |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,154,689 B1 | 12/2006 | Shepherd et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,245,444 B2 * | 7/2007 | Galbraith et al. ............... 360/46 |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |

(56) References Cited

U.S. PATENT DOCUMENTS

| | | |
|---|---|---|
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,576,951 B2 | 8/2009 | Allen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,134,802 B2 | 3/2012 | Bai et al. |
| 8,145,934 B1 | 3/2012 | Ferris et al. |
| 8,159,769 B2 | 4/2012 | Batra et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,264,918 B2 | 9/2012 | Hashimoto et al. |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,462,468 B2 | 6/2013 | Katada et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 2010/0035085 A1 | 2/2010 | Jung et al. |
| 2011/0194213 A1 | 8/2011 | Gao et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

W. Lin, et al., "Precise Measurement of the Transition Curvature in Magnetic Recording," IEEE Trans. on Magnetics, vol. 47, No. 10, Oct. 2011, 4 pages.

* cited by examiner

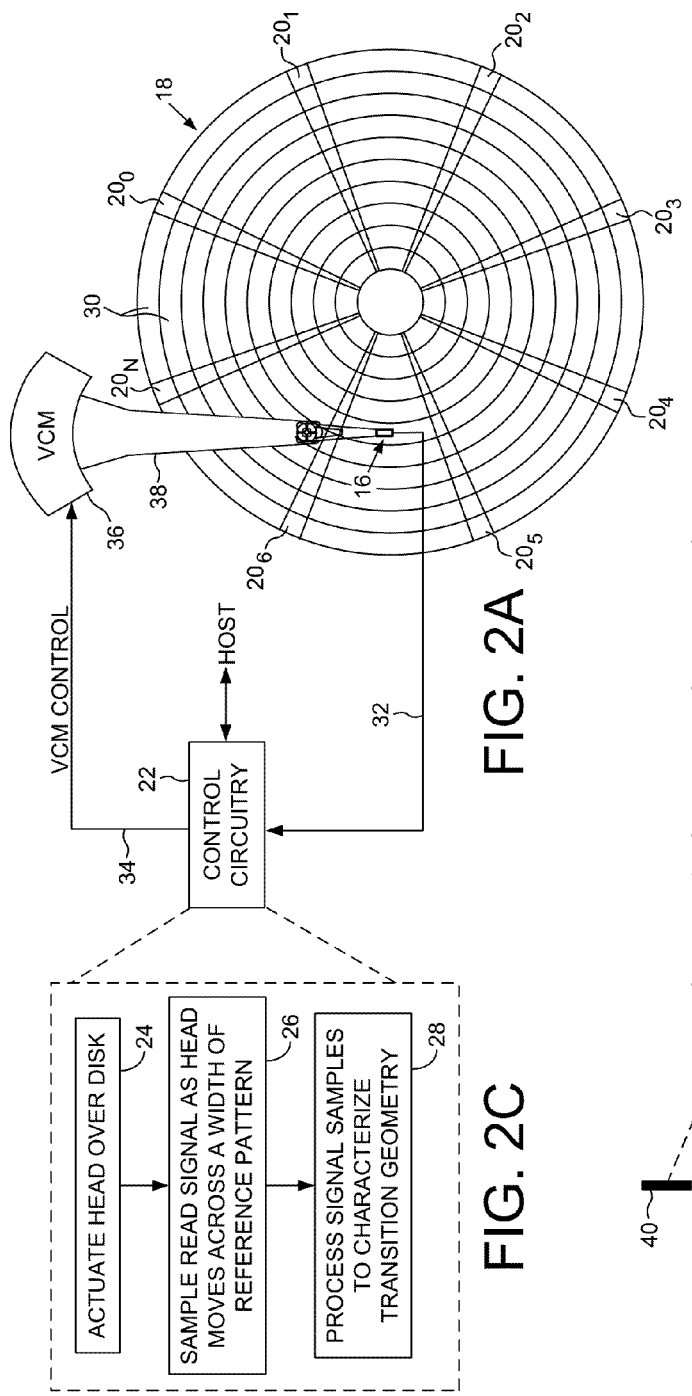
FIG. 2A
FIG. 2C
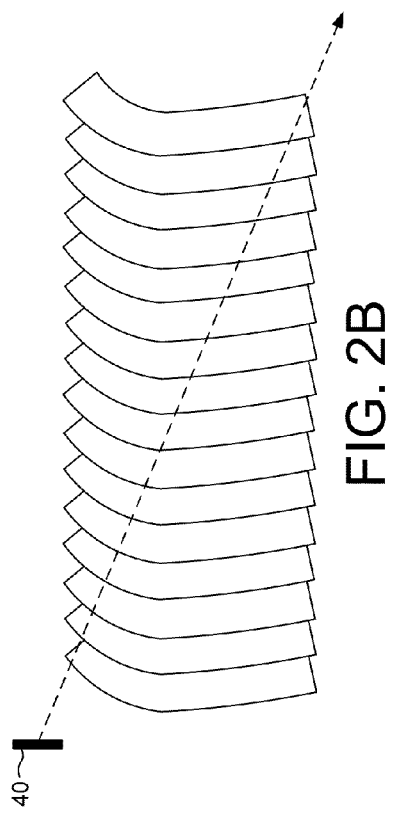
FIG. 2B

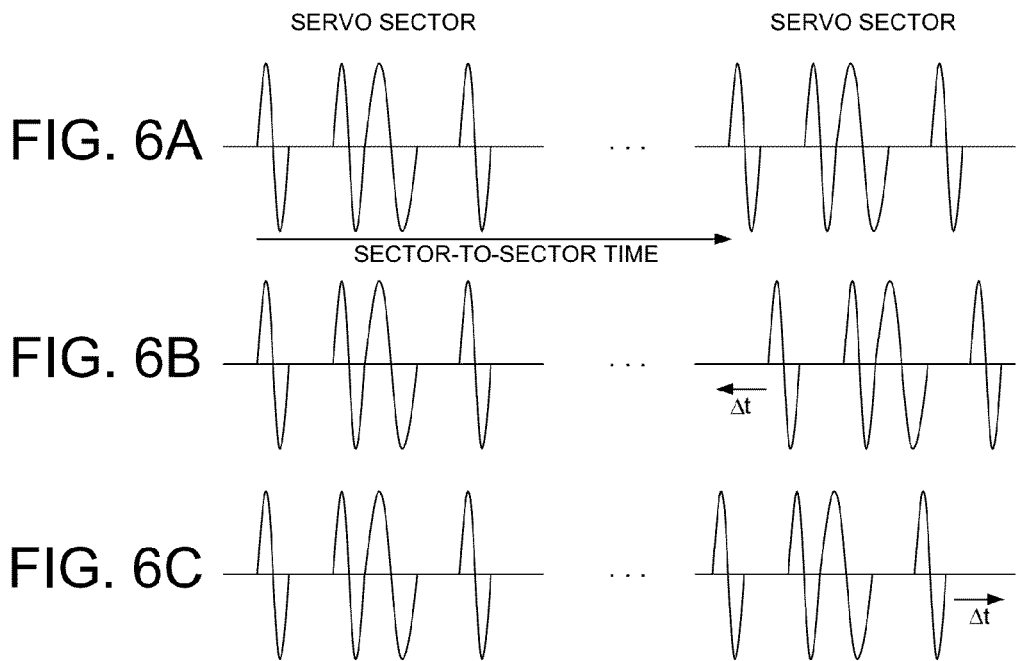
FIG. 6A
FIG. 6B
FIG. 6C
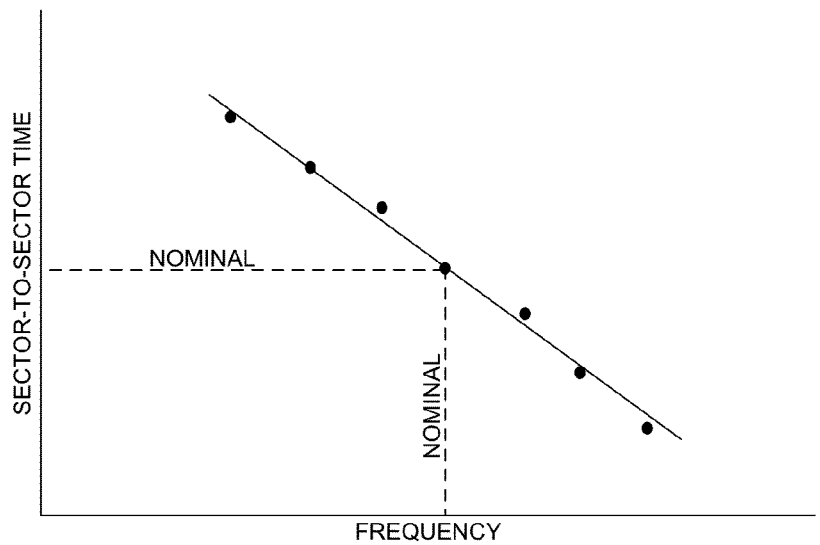
FIG. 7

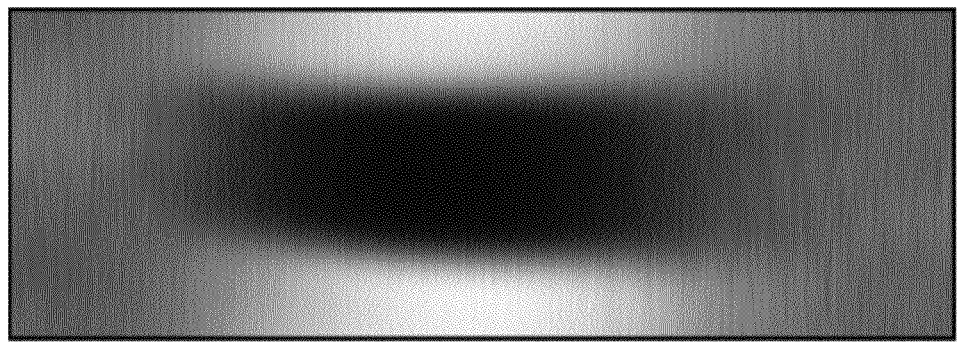
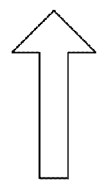
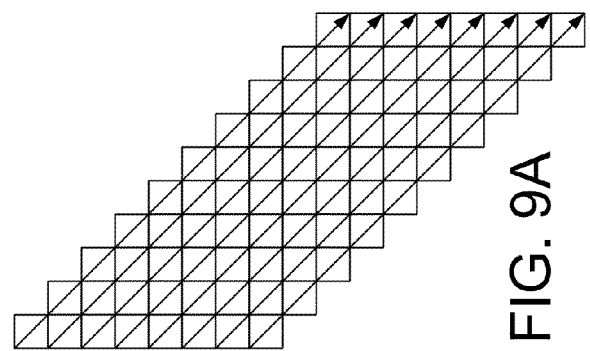
FIG. 9B
FIG. 9A

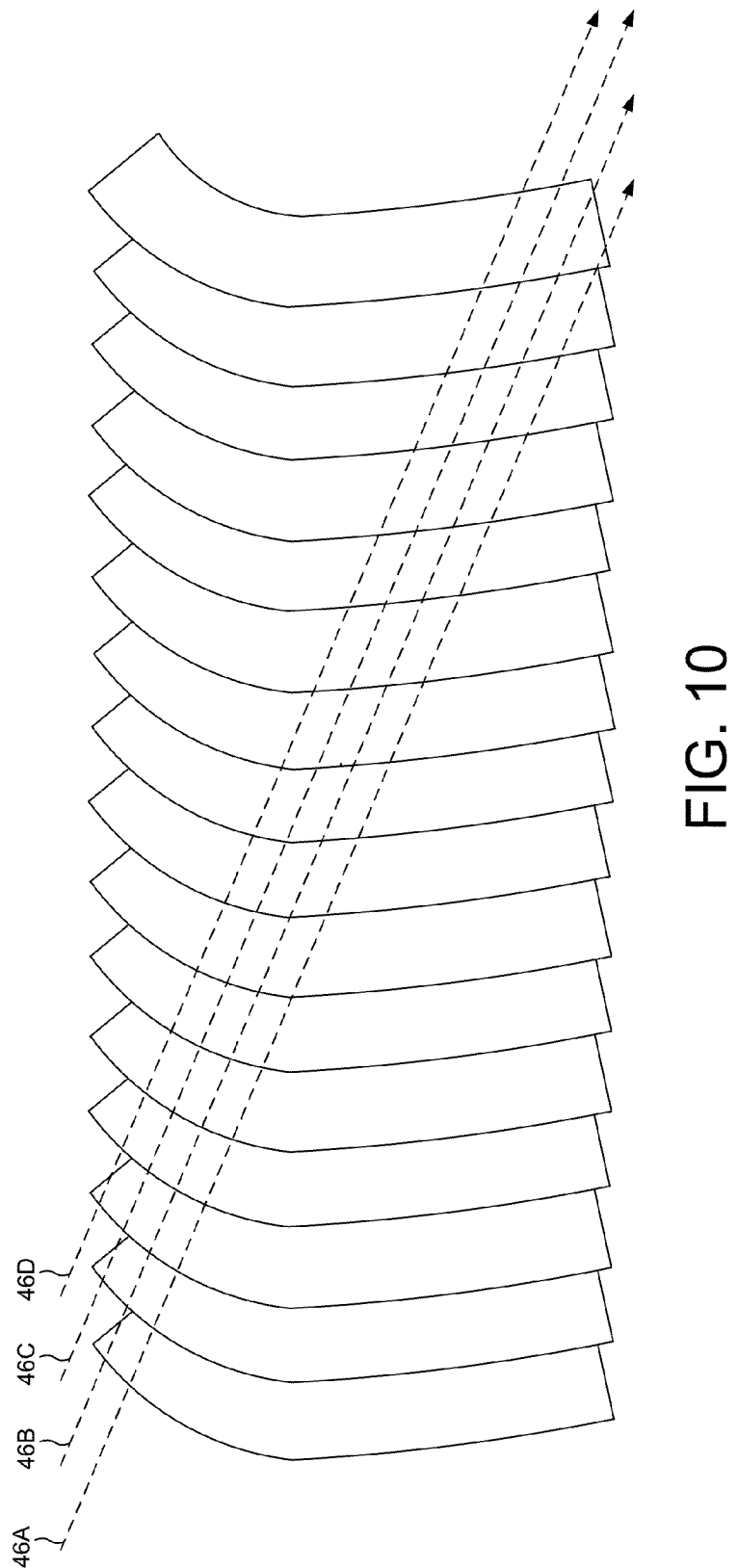

DATA STORAGE DEVICE CHARACTERIZING GEOMETRY OF MAGNETIC TRANSITIONS

CROSS-REFERENCE TO RELATED APPLICATION(S)

This application claims the benefit of priority of U.S. Provisional Application No. 61/950,766 filed Mar. 10, 2014, which is incorporated herein in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive comprising a head actuated over a disk.

FIG. 2B shows an embodiment wherein the disk comprises a reference pattern comprising a plurality of magnetic transitions.

FIG. 2C is a flow diagram according to an embodiment wherein as the head moves across a width of the reference pattern a read signal is sampled, and the signal samples are processed to characterize a geometry of the magnetic transitions.

FIGS. 6A-6C show an embodiment wherein a sector-to-sector time may vary due to variations in the disk rotation speed.

FIG. 7 plots a frequency of the signal samples versus the sector-to-sector time according to an embodiment.

FIGS. 9A and 9B show an embodiment wherein the signal samples are parsed into sections each representing a cross-section of a periodic sequence in the reference pattern, and a raster image of the periodic sequence is generated by combining the sections.

FIG. 10 shows an embodiment wherein the head is moved across the width of the reference pattern at different starting locations and the resulting signal samples averaged.

DETAILED DESCRIPTION

Figure 1:
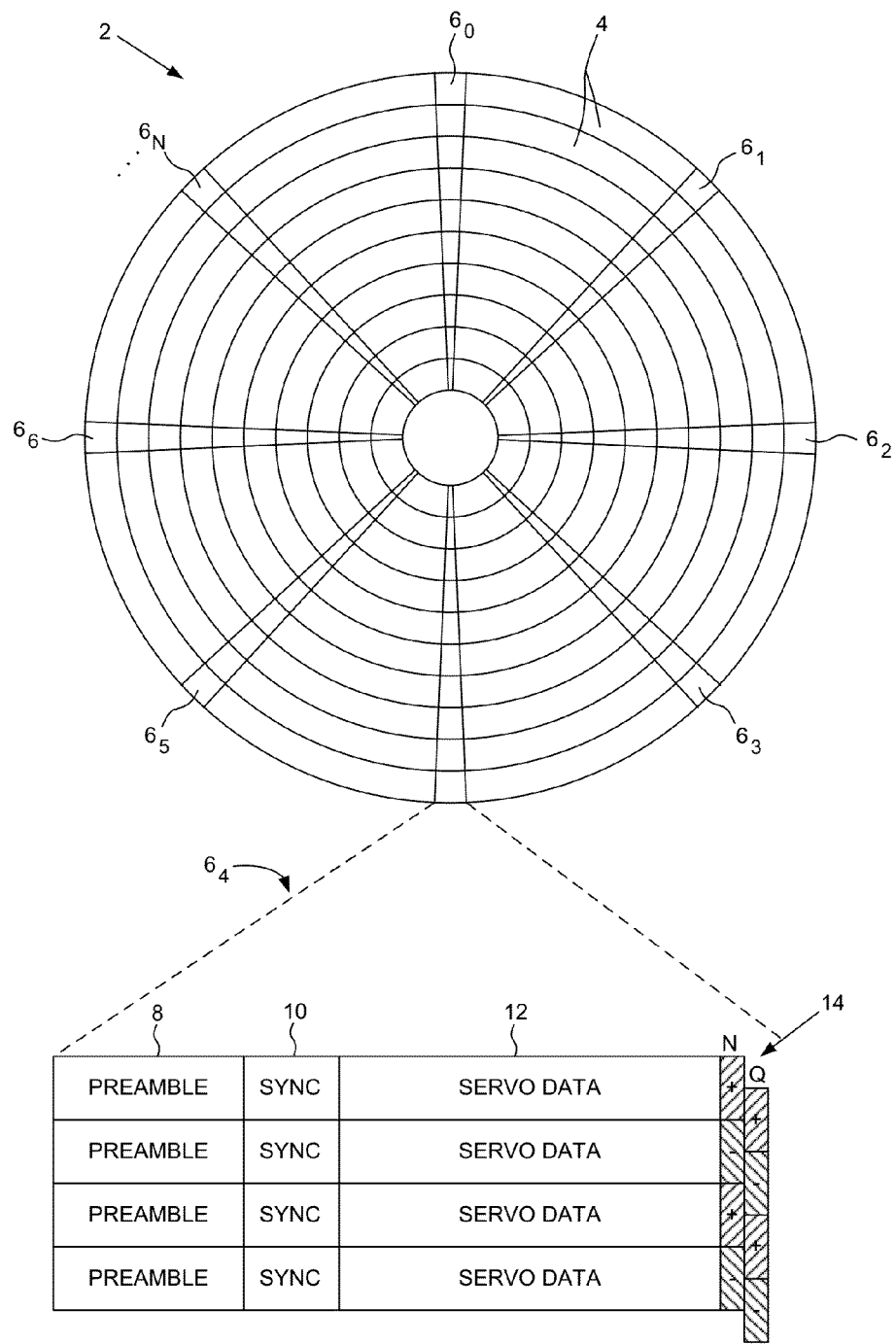
FIG. 1 shows a prior art disk format comprising a plurality of servo sectors defining servo tracks.

FIG. 2A shows a data storage device in the form of a disk drive according to an embodiment comprising a head 16 and a disk 18 comprising servo information (e.g., servo sectors $20_0$-$20_N$) and a reference pattern (e.g., FIG. 2B) comprising a plurality of magnetic transitions. The data storage device further comprises control circuitry 22 configured to execute the flow diagram of FIG. 2C, wherein the servo information on the disk is processed to actuate the head over the disk (block 24), and a read signal is sampled from the head as the head moves across a width of the reference pattern at a substantially constant velocity to generate signal samples (block 26). The signal samples are processed to characterize a geometry of the magnetic transitions (block 28).

In the embodiment of FIG. 2A, a plurality of concentric servo tracks are defined by embedded servo sectors $20_0$-$20_N$, wherein a plurality of concentric data tracks 30 are defined relative to the servo tracks at the same or different radial density. The control circuitry 22 processes a read signal 32 emanating from the head 16 to demodulate the servo sectors and generate a position error signal (PES) representing an error between the actual position of the head and a target position relative to a target track. The control circuitry 22 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

The recording quality of the data storage device may depend on the quality of the magnetic transitions written to the disk 18 by the write element. It may therefore be desirable to characterize a geometry of the magnetic transitions for a number of reasons, such as to screen out defective products, determine an optimal recording density (radial and/or linear density), calibrate write/read channel settings, evaluate the fabrication quality and consistency of the write element so as to improve fabrication processes, etc. FIG. 2B shows a periodic reference pattern written to the disk at a particular radial location wherein the skew angle and geometry of the write element causes the resulting magnetic transitions to exhibit a curved shape as compared to an ideal rectangular shape. Accordingly, it may be desirable to characterize the geometry of the magnetic transitions written to the disk, such as a curvature of the magnetic transitions.

Referring to FIG. 2B, the geometry of the magnetic transitions may be measured by servoing the read element 40 of the head at a varying offset relative to a center of the reference pattern. For example, the control circuitry 22 may servo the head 16 based on the servo sectors $20_0$-$20_N$ so as to maintain the read element 40 at the upper edge of the reference pattern and save the resulting signal samples during a first revolution of the disk. The control circuitry 22 may then step the read element 40 inward toward the center of the reference pattern and save the resulting signal samples during a second revolution of the disk. This process may then be repeated until multiple linear sections of the magnetic transitions have been generated, wherein the linear sections could be combined to form a complete geometric representation of the magnetic transitions. However, imperfections in the servo sectors $20_0$-$20_N$ may cause a relative distortion in the linear sections thereby distorting the measured geometry of the magnetic transitions. For example, there may be an error when stitching the sync marks in consecutive servo sectors (wedge) such that the sync marks are not exactly radially coherent, thereby introducing a timing error between the linear sections that is not easily compensated. In addition, imperfections in the servo bursts in the servo sectors $20_0$-$20_N$ may result in a non-linear position measurement relative to the off-track displacement of the read element 40. This non-linear distortion in the measured position of the read element 40 distorts the measured geometry of the magnetic transitions that is not easily compensated.

Instead of stepping the read element 40 across the width of the reference pattern to measure multiple linear sections of the reference pattern, in one embodiment the read element 40 is moved across the width of the reference pattern at a substantially constant velocity while saving the resulting signal samples. The saved signal samples are then processed to measure a geometry of the magnetic transitions that is substantially unaffected by imperfections in the servo sectors $20_0$-$20_N$. An example of this embodiment is illustrated in FIG. 2B wherein the reference pattern comprises a substantially concentric reference pattern and the control circuitry processes the servo sectors $20_0$-$20_N$ to move the read element 40 radially over the disk at the substantially constant velocity across the width of the reference pattern. As explained in greater detail below, because the read element 40 moves across the width of the reference pattern at the substantially constant velocity, the resulting signal samples can be parsed into small sections of a magnetic transition which may be combined to form a complete geometric representation of the whole magnetic transition. In addition, in one embodiment the read element 40 moves across the width of the reference pattern during a single revolution of the disk and within the sector-to-sector time of two consecutive servo sectors, thereby avoiding the above described distortions caused by stepping the read element 40 across the width of the reference pattern over multiple disk revolutions based on servo sectors $20_0$-$20_N$ that may be radially incoherent as well as exhibit a non-linear radial position response. In some embodiments, some or all of the process shown in FIG. 2C, as well as the additional processing described in the figures below, may be carried out by control circuitry in a device that is separate from the disk drive (e.g., a spin stand or other testing/computing device) that can direct the movement of the head to accomplish the sampling and processing of signal samples.

Figure 3:
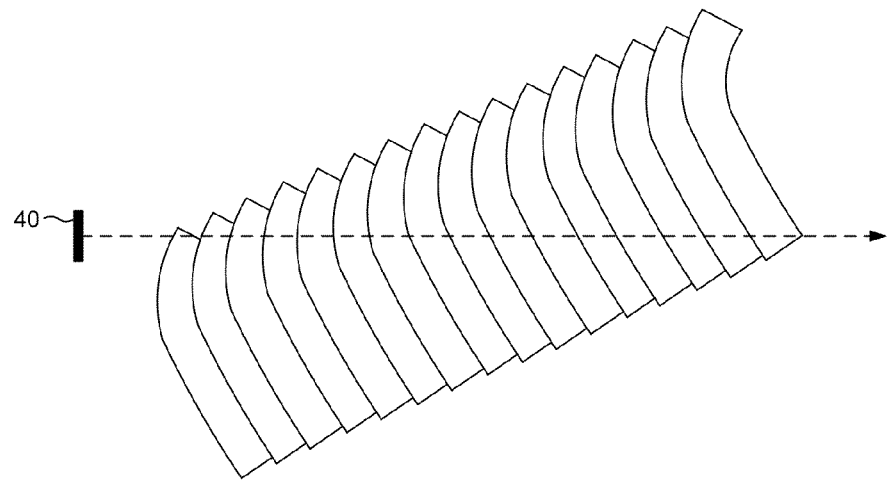
FIG. 3 shows an embodiment wherein the reference pattern comprises a substantially slanted reference pattern and the head is maintained at a substantially fixed radial location so that the head moves across the width of the reference pattern as the disk rotates.

FIG. 3 shows an embodiment wherein the reference pattern comprises a substantially slanted reference pattern, and the control circuitry process the servo sectors $20_0$-$20_N$ to maintain the head at a substantially fixed radial location so that the read element 40 moves across the width of the reference pattern at the substantially constant velocity as the disk rotates. In yet another embodiment, the read element 40 may be moved radially over a slanted reference pattern, and in general, the reference pattern is written and then read in a manner that causes the read element 40 to move across the width of the reference pattern so that the resulting signal samples provide a substantially distortion-free geometric representation of the magnetic transitions.

Figure 4:
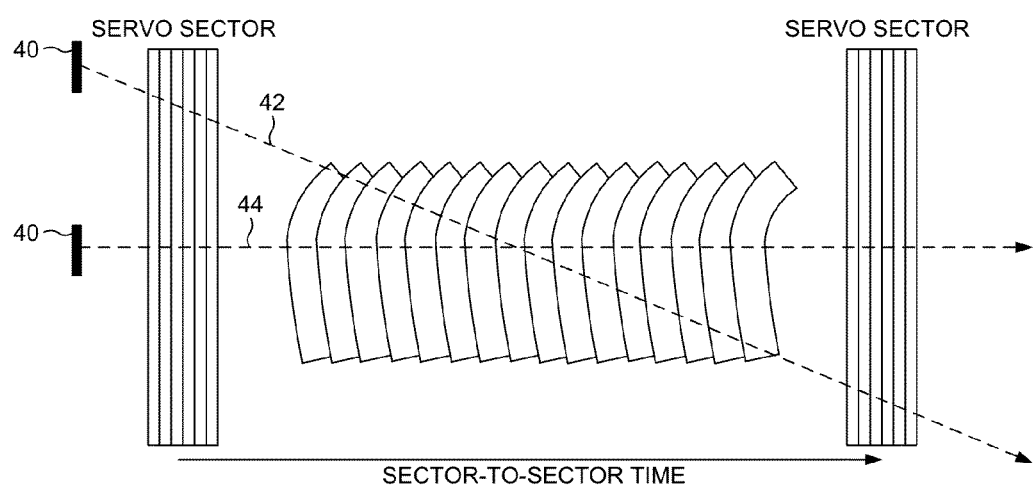
FIG. 4 shows an embodiment wherein a first sector-to-sector time is measured for the head to pass over a first servo sector until the head passes over a second servo sector during a first revolution of the disk, and a second sector-to-sector time is measured for the head to pass over the first servo sector until the head passes over the second servo sector during a second revolution of the disk, wherein the head moves across the width of the reference pattern during the second sector-to-sector time.
Figures 5A, 5B:
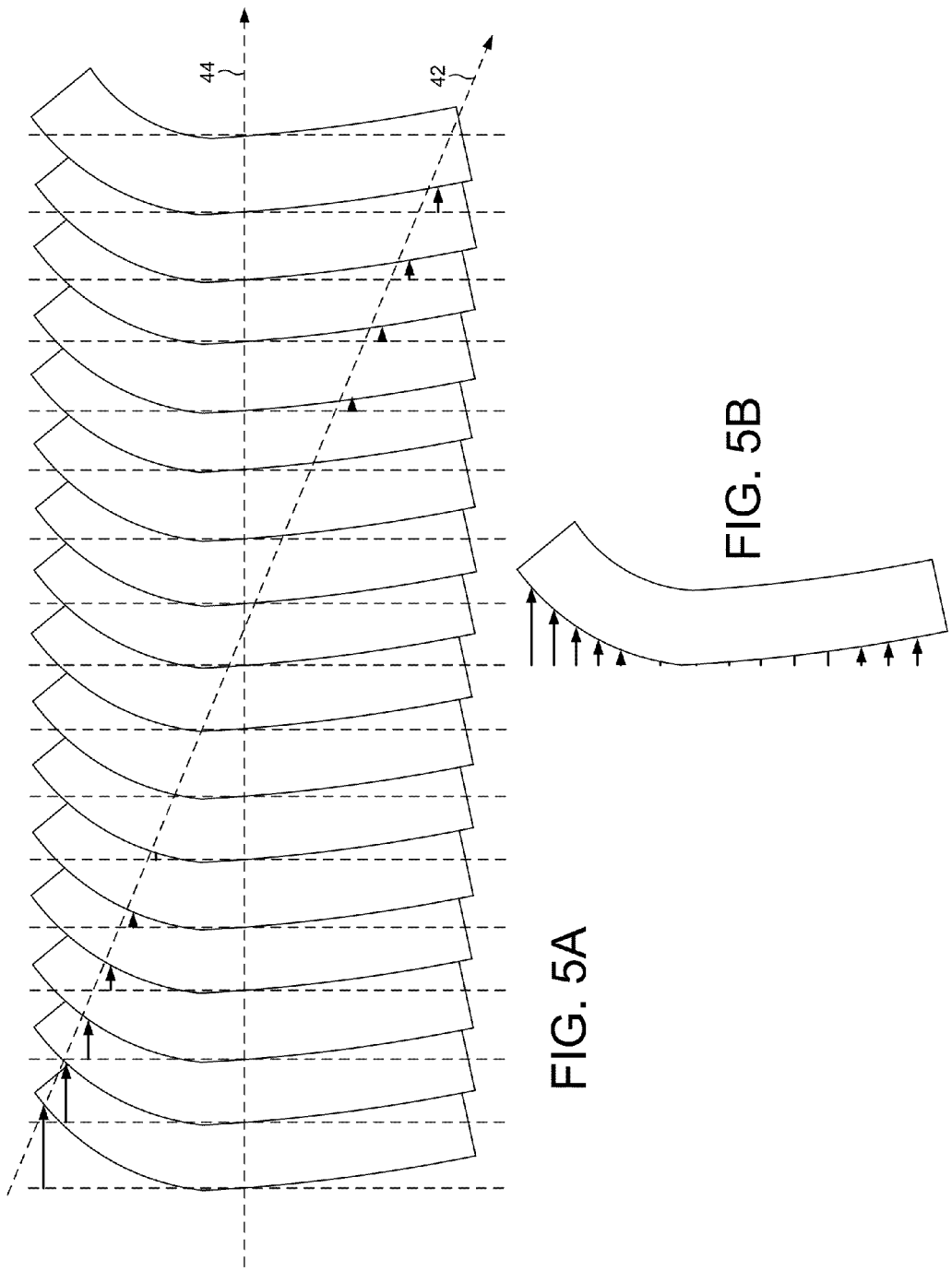
FIGS. 5A and 5B show an embodiment wherein the signal samples of the reference pattern are processed to measure a phase shift of a nominal frequency due to the head moving across the width of the reference pattern.

FIG. 4 shows an example where the read element 40 follows along trajectory 42 and moves across the width of the reference pattern during a single revolution of the disk and within the sector-to-sector time of two consecutive servo sectors. In one embodiment, a nominal frequency of the magnetic transitions is measured, and the signal samples are processed to measure a phase shift of the nominal frequency due to the head moving across the width of the reference pattern. In the embodiment of FIG. 4, the nominal frequency of the magnetic transitions is measured during a first revolution of the disk by servoing the read element 40 over the center of the reference pattern so that the read element 40 follows trajectory 44 while processing the resulting signal samples (e.g., computing a discrete Fourier transform (DFT)). During a second revolution of the disk, a phase shift of the nominal frequency is measured due to the head moving across the width of the reference pattern. This embodiment is illustrated in FIG. 5A wherein the center of the magnetic transitions in the reference pattern represent a zero phase shift. As the read element 40 moves across the width of the reference pattern the resulting signal samples are processed to measure the phase shift (represented as black arrows) relative to the center of the magnetic transitions. The phase shift may be measured in any suitable manner, such as by computing a DFT of the signal samples and comparing the result to the DFT of the signal samples while the read element 40 is servoed over the center of the reference pattern along trajectory 44. FIG. 5B illustrates how the measured phase shifts across the width of the reference pattern provides a geometric representation (e.g., curvature) of the magnetic transitions.

In one embodiment, there may be a time difference in the sector-to-sector time from the first disk revolution when reading the center of the reference pattern to measure the nominal frequency and the second disk revolution when reading across the width of the reference pattern to measure the phase shifts as shown in FIG. 5A. The time difference may be due, for example, to a difference in the rotation speed of the disk from the first disk revolution to the second disk revolution. This difference in rotation speed translates into a change in the nominal frequency of the magnetic transitions which may distort the measured phase shifts. Accordingly, in one embodiment a first sector-to-sector time when reading the center of the reference pattern (e.g., during the first disk revolution) is measured, and a second sector-to-sector time when reading across the width of the reference pattern (e.g., during the second disk revolution) is measured, and the difference in the sector-to-sector times is used to adjust the measured phase shifts. That is, the difference between the sector-to-sector times represents a frequency shift that is compensated when measuring the phase shifts shown in FIG. 5B.

In one embodiment illustrated in FIG. 7, the center of the reference pattern is read multiple times over multiple disk revolutions. For each disk revolution, a frequency of the magnetic transitions is measured as well as a corresponding sector-to-sector time. The data points may then be fitted to a curve (e.g., a line in the example of FIG. 7) using any suitable technique. A nominal frequency for the magnetic transitions is then selected at some point along the curve (e.g., the middle of the line) which has a corresponding nominal sector-to-sector time. When reading across the width of the reference pattern (e.g., when following trajectory 42 in FIG. 5A), the sector-to-sector time is measured and the corresponding frequency determined from the curve fitted function such as shown in FIG. 7. The difference between the nominal frequency and the measured frequency (the frequency difference) is then used to adjust the phase shift measurements.

Any suitable technique may be used to measure the sector-to-sector time in order to generate the corresponding relationship with the frequency of the magnetic transitions as determined from the rotation speed of the disk. FIGS. 6A-6C illustrate an embodiment wherein each servo sector comprises the same pattern of data, such as the sync mark or the high order bits of the track address shown in FIG. 1. When reading the reference pattern, the read signal is sampled with a fixed sampling clock at a known frequency. When the disk is rotating at the nominal speed, the resulting waveform shown in FIG. 6A will be generated with the same pattern of pulses in both servo sectors. When the rotation speed changes, the pattern of pulses in the second servo sector will shift right or left in time relative to the sampling clock. This shift in time (Δt) may be measured by correlating the signal samples of an arbitrary speed revolution with the signal samples of the nominal speed revolution. The correlation is computed while shifting the arbitrary signal samples of the pulses (e.g., FIG. 6B) in time relative to the nominal signal samples (FIG. 6A), wherein the shift in time (Δt) of the arbitrary signal samples relative to the nominal signal samples is identified when the correlation reaches a maximum. In the example of FIG. 6B, the correlation reaches a maximum when the arbitrary signal samples are shifted left in time until the pulses of the second servo sector align with the pulses of FIG. 6A (this shift is due to a slower disk rotation speed). In the example of FIG. 6C, the correlation reaches a maximum when the arbitrary signal samples are shifted right in time until the pulses align with the pulses of FIG. 6A (this shift is due to a faster disk rotation speed).

Figure 8:
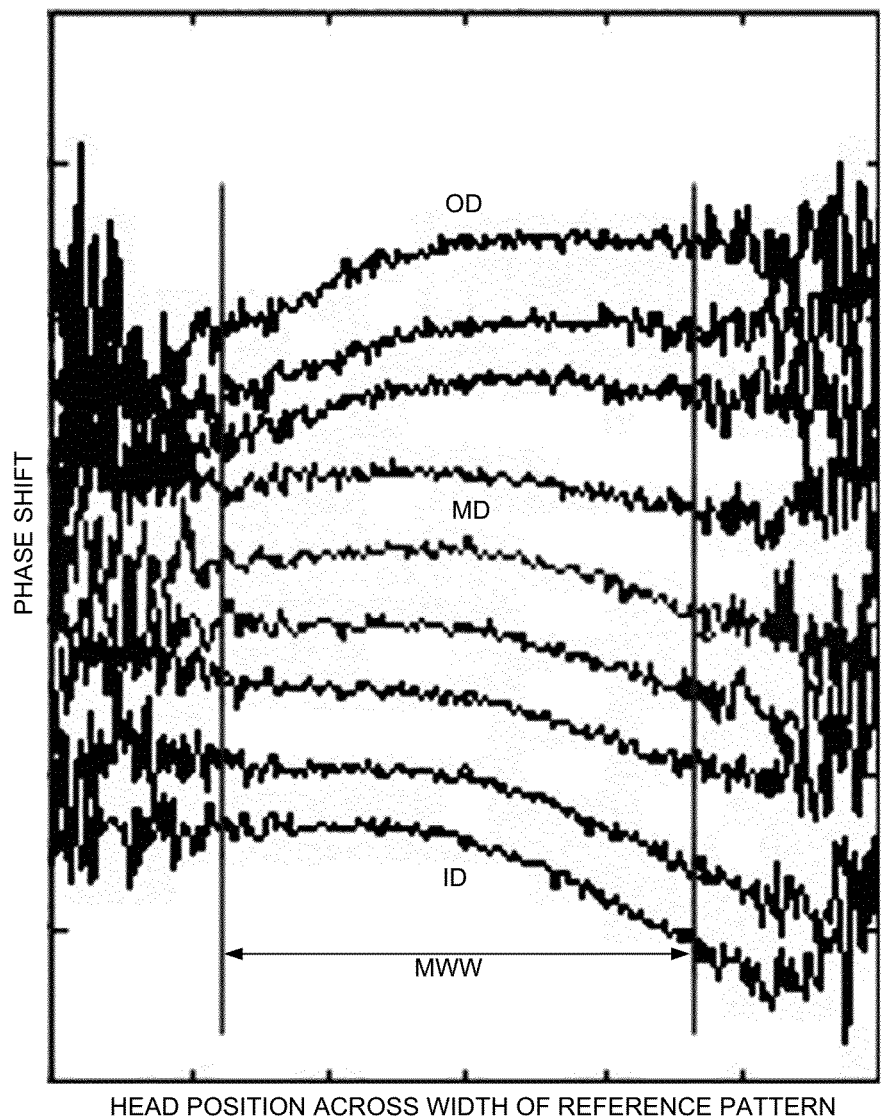
FIG. 8 shows an embodiment wherein the phase shift profile representing the geometry of the magnetic transitions varies due to a skew angle of the head changing over the radius of the disk.

In one embodiment, the geometric shape of the magnetic transitions varies across the radius of the disk due to the varying skew angle of the head 16. FIG. 8 illustrates an example of this embodiment which shows a number of plots representing a varying phase shift (similar to FIG. 5B) across the width of the reference pattern. When the head is near the middle diameter (MD) of the disk where the head skew is substantially zero, there is only a small amount of curvature in the magnetic transitions. As the head moves toward the outer diameter (OD), the curvature increases toward the left side of the plot, and as the head moves toward the inner diameter (ID), the curvature increases toward the right side of the plot. The reversing effect in the curvature of the magnetic transitions as shown in FIG. 8 is due to the reversing skew angle of the head 16 as the head 16 moves from the OD to the ID.

In one embodiment after moving the read element 40 across the width of the reference pattern, the control circuitry 22 parses the signal samples into sections each representing a cross-section of a periodic sequence in the reference pattern as illustrated in the example of FIG. 9A, and then generates a raster image by combining the sections as illustrated in the example of FIG. 9B. That is, the sections of signal samples that represent a cross-section of the periodic sequence in the reference pattern (e.g., the signal samples representing a cross-section of a magnetic transition in FIG. 2B) are stacked vertically as shown in FIG. 9A thereby forming a complete raster image of the periodic sequence such as shown in FIG. 9B. In the example of FIG. 2B, the periodic sequence in the reference pattern comprises a repeating sequence of magnetic transitions, and therefore FIG. 9B shows a raster image representing a single magnetic transition. In other embodiments, the periodic sequence in the reference pattern may comprise a higher or lower frequency of magnetic transitions, a repeating sequence of random magnetic transitions, or any other suitable periodic sequence of magnetic transitions.

In one embodiment, prior to combining the sections of signal samples as shown in FIG. 9A the control circuitry 22 resamples the signal samples so that each section comprises the same number of signal samples. For example, in the embodiment shown in FIG. 9A the signal samples may be resampled so that each section of signal samples comprises ten signal samples. In this manner, the sections of signal samples align correctly when stacking the sections to form the raster image as illustrated in FIGS. 9A and 9B. In one embodiment, the above described sector-to-sector time and corresponding measured frequency of the magnetic transitions is used to resample the signal samples so that the total number of signal samples across the width of the reference pattern matches a target nominal value. In other words, if the reference pattern is sampled at the nominal frequency (nominal disk rotation speed), the total number of signal samples will match a target nominal value and each section will comprise the same number of signal samples without needing to resample. As the disk rotation speed varies from the nominal rotation speed, the frequency of the magnetic transitions deviates from the nominal frequency and therefore the signal samples are resampled to achieve the nominal number of signal samples across the width of the reference pattern. In other embodiments, the signal samples may be resampled to achieve any target number of signal samples per cross-section of the periodic sequence in the reference pattern so long as each section comprises the same number of signal samples. For example, the signal samples may be significantly up-sampled (e.g., to a multiple of the nominal frequency) so as to achieve a higher resolution in the resulting raster image.

FIG. 10 illustrates an embodiment wherein the control circuitry 22 processes the servo information to control the position of the head so that the head moves across the width of the reference pattern at a first starting location during a first revolution of the disk to generate first signal samples. For example, the control circuitry 22 may processes the servo information so that the head follows trajectory 46A as it moves across the width of the reference pattern. The control circuitry 22 then processes the servo information to control the position of the head so that the head moves across the width of the reference pattern at a second starting location different from the first starting location during a second revolution of the disk to generate second signal samples. For example, the control circuitry 22 may processes the servo information so that the head follows trajectory 46B as it moves across the width of the reference pattern. The control circuitry 22 may repeat this operation any suitable number of times, such as four times in the example shown in FIG. 10. The control circuitry 22 may then average the resulting signal samples to generate a combined sequence of signal samples, wherein the averaging may help reduce noise in the final sequence due, for example, to a low quality cross-section of the reference pattern along a single one of the trajectories. In one embodiment prior to averaging, the signal samples are resampled to account for the varying frequency of transitions due to the varying rotation speed of the disk when following the different trajectories shown in FIG. 10.

Figure 11:
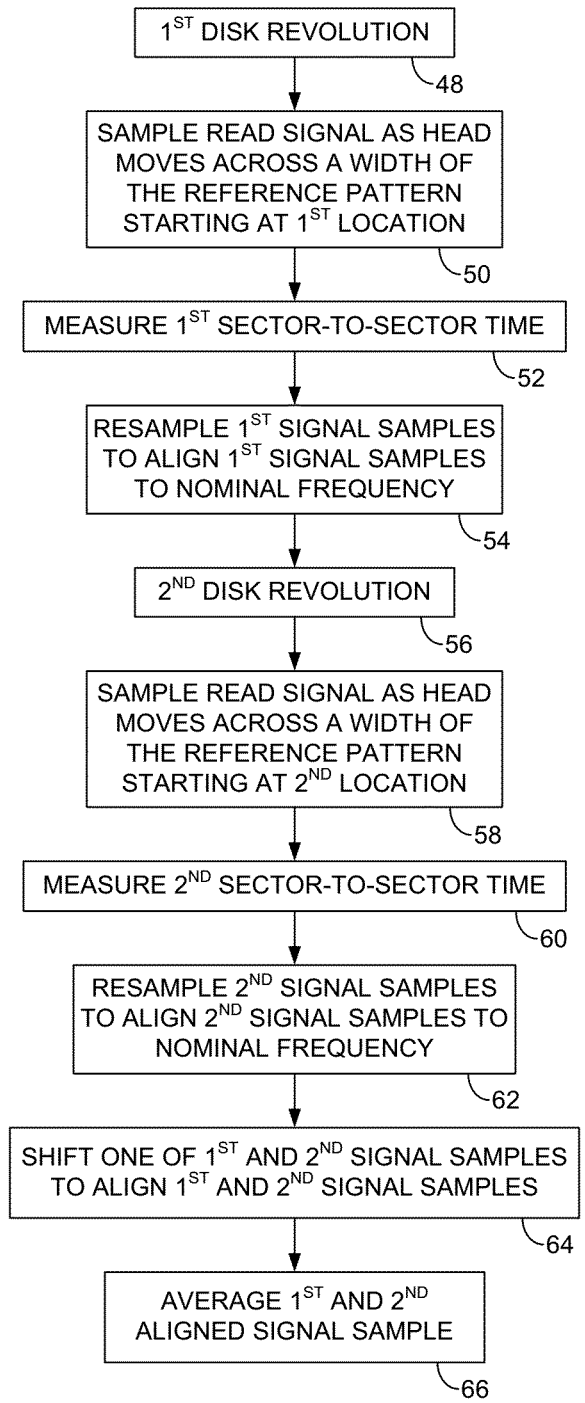
FIG. 11 shows an embodiment wherein the signal samples are resampled and aligned in time before being averaged.

This embodiment is further understood with reference to the flow diagram of FIG. 11, wherein during a first disk revolution (block 48) the read signal from the head is sampled (block 50) as the head moves across the width of the reference pattern starting at a first location (e.g., to follow trajectory 46A of FIG. 10). The sector-to-sector time is measured as described above with reference to FIG. 4 (block 52), and the sector-to-sector time is used to resample the signal samples so as to comprise a target number of samples. During a second revolution of the disk (block 56), the read signal from the head is sampled (block 58) as the head moves across the width of the reference pattern starting at a second location (e.g., to follow trajectory 46B of FIG. 10). The sector-to-sector time is measured (block 60), and the sector-to-sector time is used to resample the signal samples so as to comprise the target number of samples. One of the resampled signal sample sequences is then shifted so that both signal sample sequences align in time, thereby compensating for any phase offset between the signal sample sequences (block 64). Any suitable technique may be employed to align the signal sample sequences, such as by shifting the sequences relative to a target one of the sequences and stopping when a correlation between the sequences reaches a maximum. After resampling the signal sample sequences so they comprise the same number of samples, and after aligning the resampled sequences, the signal samples across the sequences are averaged (block 66) thereby forming a combined, noise attenuated sequence of signal samples. The noise attenuated sequence may then be processed to measure a geometry of the magnetic transitions and/or to generate a raster image of the magnetic transitions as described above.

In one embodiment, the signal sample sequences are up-sampled (at blocks 54 and 62 of FIG. 11) so as to match the signal sample sequence that comprises the most number of samples. That is, the target number of samples for resampling equals the number of samples in the highest resolution signal sample sequence. In yet another embodiment, the signal sample sequences may be significantly up-sampled to any target frequency, such as a multiple of a nominal frequency, thereby increasing the resolution of all the signal sample sequences.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In some embodiments the control circuitry may reside within a device external to the disk drive or other like storage devices.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising servo information and a reference pattern comprising a plurality of magnetic transitions;
   a head; and
   control circuitry configured to:
      process the servo information on the disk to actuate the head over the disk;
      sample a read signal from the head as the head moves across a width of the reference pattern at a substantially constant velocity to generate signal samples; and process the signal samples to characterize a two-dimensional geometry of the magnetic transitions.

2. The data storage device as recited in claim 1, wherein:
the reference pattern comprises a substantially concentric reference pattern; and
the control circuitry is configured to process the servo information to move the head radially over the disk at the substantially constant velocity across the width of the reference pattern.

3. The data storage device as recited in claim 1, wherein:
the reference pattern comprises a substantially slanted reference pattern; and
the control circuitry is configured to process the servo information to maintain the head at a substantially fixed radial location so that the head moves across the width of the reference pattern at the substantially constant velocity as the disk rotates.

4. The data storage device as recited in claim 1, wherein the control circuitry is further configured to characterize the two-dimensional geometry of the magnetic transitions by:
measuring a nominal frequency of the magnetic transitions; and
processing the signal samples to measure a phase shift of the nominal frequency due to the head moving across the width of the reference pattern.

5. The data storage device as recited in claim 4, wherein the control circuitry is further configured to:
measure the nominal frequency of the magnetic transitions during a first revolution of the disk; and
process the signal samples generated as the head moves across the width of the reference pattern during a second revolution of the disk to measure the phase shift of the nominal frequency.

6. The data storage device as recited in claim 5, wherein the servo information comprises a plurality of servo sectors and the control circuitry is further configured to:
measure a first sector-to-sector time for the head to pass over a first servo sector until the head passes over a second servo sector during the first revolution of the disk, wherein the head moves along the reference pattern during the first sector-to-sector time;
measure a second sector-to-sector time for the head to pass over the first servo sector until the head passes over the second servo sector during the second revolution of the disk, wherein the head moves across the width of the reference pattern during the second sector-to-sector time; and
measure the phase shift of the nominal frequency based on the first sector-to-sector time and the second sector-to-sector time.

7. The data storage device as recited in claim 1, wherein the control circuitry is further configured to characterize the two-dimensional geometry of the magnetic transitions by:
parsing the signal samples into sections each representing a cross-section of a periodic sequence in the reference pattern; and
generating a raster image by combining the sections.

8. The data storage device as recited in claim 7, wherein the control circuitry is further configured to characterize the two-dimensional geometry of the magnetic transitions by resampling the signal samples so that each section comprises the same number of signal samples.

9. The data storage device as recited in claim 1, wherein the control circuitry is further configured to:
process the servo information to control the position of the head so that the head moves across the width of the reference pattern at a first starting location during a first revolution of the disk to generate first signal samples; and
process the servo information to control the position of the head so that the head moves across the width of the reference pattern at a second starting location different from the first starting location during a second revolution of the disk to generate second signal samples.

10. The data storage device as recited in claim 9, wherein the control circuitry is further configured to characterize the two-dimensional geometry of the magnetic transitions by averaging the first signal samples and the second signal samples.

11. The data storage device as recited in claim 10, wherein the control circuitry is further configured to shift at least one of the first signal samples and the second signal samples prior to averaging the signal samples, thereby compensating for the difference between the first starting location and the second starting location.

12. A device comprising control circuitry configured to:
measure, for a head actuated over a disk comprising a first servo sector, a second servo sector, and a reference pattern comprising a plurality of magnetic transitions, a first sector-to-sector time for the head to pass over the first servo sector until the head passes over the second servo sector during a first revolution of the disk, wherein the head moves along the reference pattern during the first sector-to-sector time;
measure a second sector-to-sector time for the head to pass over the first servo sector until the head passes over the second servo sector during a second revolution of the disk, wherein the head moves across a width of the reference pattern during the second sector-to-sector time;
sample a read signal from the head as the head moves along the reference pattern during the first sector-to-sector time to generate first signal samples;
estimate a first frequency of the magnetic transitions based on the first signal samples;
sample the read signal from the head as the head moves across a width of the reference pattern during the second sector-to-sector time to generate second signal samples; and
estimate a frequency delta between the first frequency and a second frequency of the magnetic transitions based on the second signal samples, wherein the frequency delta is estimated based on the first sector-to-sector time and the second sector-to-sector time.

13. The device as recited in claim 12, further comprising the head and the disk.

14. A device comprising control circuitry configured to:
sample a read signal from a head of a disk comprising servo information and a reference pattern comprising a plurality of magnetic transitions, as the head moves across a width of the reference pattern at a substantially constant velocity to generate signal samples; and
process the signal samples to characterize a two-dimensional geometry of the magnetic transitions.

15. The device as recited in claim 14 wherein the reference pattern comprises a substantially concentric reference pattern and the control circuitry is further configured to move the head radially over the disk at the substantially constant velocity across the width of the reference pattern.

16. The device as recited in claim 14, wherein the reference pattern comprises a substantially slanted reference pattern and the control circuitry is further configured to maintain the head at a substantially fixed radial location so that the head moves across the width of the reference pattern at the substantially constant velocity as the disk rotates.

17. The device as recited in claim 14, wherein the control circuitry is further configured to characterize the two-dimensional geometry of the magnetic transitions by:
    measuring a nominal frequency of the magnetic transitions; and
    processing the signal samples to measure a phase shift of the nominal frequency due to the head moving across the width of the reference pattern.

18. A method of operating a data storage device, the method comprising:
    processing servo information on a disk to actuate a head over the disk;
    sampling a read signal from the head as the head moves across a width of a reference pattern on the disk at a substantially constant velocity to generate signal samples, the reference pattern comprising a plurality of magnetic transitions; and
    processing the signal samples to characterize a two-dimensional geometry of the magnetic transitions.

19. The method as recited in claim 18, wherein:
    the reference pattern comprises a substantially concentric reference pattern; and
    the method further comprises processing the servo information to move the head radially over the disk at the substantially constant velocity across the width of the reference pattern.

20. The method as recited in claim 18, wherein:
    the reference pattern comprises a substantially slanted reference pattern; and
    the method further comprises processing the servo information to maintain the head at a substantially fixed radial location so that the head moves across the width of the reference pattern at the substantially constant velocity as the disk rotates.

21. The method as recited in claim 18, further comprising characterizing the two-dimensional geometry of the magnetic transitions by:
    measuring a nominal frequency of the magnetic transitions; and
    processing the signal samples to measure a phase shift of the nominal frequency due to the head moving across the width of the reference pattern.

22. The method as recited in claim 21, further comprising:
    measuring the nominal frequency of the magnetic transitions during a first revolution of the disk; and
    processing the signal samples generated as the head moves across the width of the reference pattern during a second revolution of the disk to measure the phase shift of the nominal frequency.

23. The method as recited in claim 22, wherein the servo information comprises a plurality of servo sectors and the method further comprises:
    measuring a first sector-to-sector time for the head to pass over a first servo sector until the head passes over a second servo sector during the first revolution of the disk, wherein the head moves along the reference pattern during the first sector-to-sector time;
    measuring a second sector-to-sector time for the head to pass over the first servo sector until the head passes over the second servo sector during the second revolution of the disk, wherein the head moves across the width of the reference pattern during the second sector-to-sector time; and
    measuring the phase shift of the nominal frequency based on the first sector-to-sector time and the second sector-to-sector time.

24. The method as recited in claim 18, further comprising characterizing the two-dimensional geometry of the magnetic transitions by:
    parsing the signal samples into sections each representing a cross-section of a periodic sequence in the reference pattern; and
    generating a raster image by combining the sections.

25. The method as recited in claim 24, further comprising characterizing the two-dimensional geometry of the magnetic transitions by resampling the signal samples so that each section comprises the same number of signal samples.

26. The method as recited in claim 18, further comprising:
    processing the servo information to control the position of the head so that the head moves across the width of the reference pattern at a first starting location during a first revolution of the disk to generate first signal samples; and
    processing the servo information to control the position of the head so that the head moves across the width of the reference pattern at a second starting location different from the first starting location during a second revolution of the disk to generate second signal samples.

27. The method as recited in claim 26, wherein characterizing the two-dimensional geometry of the magnetic transitions comprises averaging the first signal samples and the second signal samples.

28. The method as recited in claim 27, further comprising shifting at least one of the first signal samples and the second signal samples prior to averaging the signal samples, thereby compensating for the difference between the first starting location and the second starting location.

29. A method of operating a device, the method comprising:
    measuring, for a head actuated over a disk comprising a first servo sector, a second servo sector, and a reference pattern comprising a plurality of magnetic transitions, a first sector-to-sector time for the head to pass over the first servo sector until the head passes over the second servo sector during a first revolution of the disk, wherein the head moves along the reference pattern during the first sector-to-sector time;
    measuring a second sector-to-sector time for the head to pass over the first servo sector until the head passes over the second servo sector during a second revolution of the disk, wherein the head moves across a width of the reference pattern during the second sector-to-sector time;
    sampling a read signal from the head as the head moves along the reference pattern during the first sector-to-sector time to generate first signal samples;
    estimating a first frequency of the magnetic transitions based on the first signal samples;
    sampling the read signal from the head as the head moves across a width of the reference pattern during the second sector-to-sector time to generate second signal samples; and
    estimating a frequency delta between the first frequency and a second frequency of the magnetic transitions based on the second signal samples, wherein the frequency delta is estimated based on the first sector-to-sector time and the second sector-to-sector time.

30. The method as recited in claim 29, wherein the device comprises the head and the disk.

31. A method of operating a device, the method comprising:
- sampling a read signal from a head over a disk comprising servo information and a reference pattern comprising a plurality of magnetic transitions, as the head moves across a width of the reference pattern at a substantially constant velocity to generate signal samples; and
- processing the signal samples to characterize a two-dimensional geometry of the magnetic transitions.

32. The method as recited in claim 31 wherein the reference pattern comprises a substantially concentric reference pattern and the method further comprises moving the head radially over the disk at the substantially constant velocity across the width of the reference pattern.

33. The method as recited in claim 31, wherein the reference pattern comprises a substantially slanted reference pattern and the method further comprises maintaining the head at a substantially fixed radial location so that the head moves across the width of the reference pattern at the substantially constant velocity as the disk rotates.

34. The method as recited in claim 31, further comprising characterizing the two-dimensional geometry of the magnetic transitions by:
- measuring a nominal frequency of the magnetic transitions; and
- processing the signal samples to measure a phase shift of the nominal frequency due to the head moving across the width of the reference pattern.

\* \* \* \* \*